Oct. 24, 1939.　　　　P. J. McLAREN　　　　2,177,437
COUNTER
Filed May 7, 1938　　　　6 Sheets-Sheet 1

Fig. 1.

INVENTOR.
Peter J. McLaren.
BY Moses & Nolte
ATTORNEYS

Oct. 24, 1939.  P. J. McLAREN  2,177,437
COUNTER
Filed May 7, 1938  6 Sheets-Sheet 2

Tens Wheel

INVENTOR.
Peter J. McLaren.
BY Moses & Nolte
ATTORNEYS

Oct. 24, 1939.   P. J. McLAREN   2,177,437
COUNTER
Filed May 7, 1938   6 Sheets-Sheet 3

INVENTOR.
Peter J. McLaren.
BY Moses & Nolte
ATTORNEYS

Oct. 24, 1939.　　　　P. J. McLAREN　　　　2,177,437
COUNTER
Filed May 7, 1938　　　　6 Sheets-Sheet 5

INVENTOR.
Peter J. McLaren.
BY Moses & Nolte
ATTORNEYS

Oct. 24, 1939.   P. J. McLAREN   2,177,437
COUNTER
Filed May 7, 1938   6 Sheets-Sheet 6

INVENTOR.
Peter J. McLaren
BY Moses & Nolte
ATTORNEYS

Patented Oct. 24, 1939

2,177,437

UNITED STATES PATENT OFFICE 2,177,437

COUNTER

Peter J. McLaren, New York, N. Y.

Application May 7, 1938, Serial No. 206,570

11 Claims. (Cl. 235—144)

This invention relates to counters and counter mechanism, and has particular reference to improvements in the carry over and zero setting features of counters.

In accordance with a salient feature of the invention, provision is made of Geneva carry over gearing between adjacent denomination wheels including pinions carried in fixed relation to a zero setting shaft. Provision is further made of means normally locking the zero setting shaft against operation while the counting is in progress, and of means for unlocking the shaft and then driving it through substantially one revolution to impart planetary movement to the pinions and thereby set the higher denomination wheels of the counters back to zero.

In this connection provision is made for causing each pinion to drive positively the wheel of higher denomination with which it is associated during counting operations, but to drive said wheel with capacity for relative slip or lost motion during zero setting operations.

In accordance with a practical and desirable embodiment of the invention, each wheel of higher denomination carries a rockable spring pressed latch which is invariably coupled to a driving gear during the counting operations and hence serves positively to drive the wheel by which it is carried in a forward direction. Spring pressed abutment members are provided, however, for co-acting with the latches, these abutments being so constructed and arranged that they may be cammed aside by the latches during forward rotation of the wheels, but will serve positively to intercept and arrest the latches when the latches are carried in the reverse direction. The arresting of a latch arrests backward rotation of its associated wheel. Each latch, by virtue of its capacity for rocking, simply permits the teeth of its driving gear to slip past beneath it during further rotation of the zero setting shaft after the latch has been arrested.

A further feature of the invention has to do with the provision of means for enabling the counter to be driven forward by an operating shaft while permitting the counter to be reset to zero without affecting the operating shaft. To this end, a slip drive, for example, a friction clutch, is interposed between the operating shaft and the primary input member of the counter.

A further feature of the invention has to do with the resetting of the wheel of lowest denomination to zero. To this end, the primary input member of the counter and a rocking lever rotatable with the zero setting shaft are provided with cooperating projections or abutments. The rocking lever includes a cam portion whereby its abutment is normally held clear of the path of the projection on the primary input member so as not to interfere with forward operation of the counter. A rockable dog normally maintains this relationship by engagement with the cam portion of the rocking lever. The dog is moved to an ineffective position, however, as an incident of the zero setting operation, and causes the abutment on the rocking lever to be shifted into position to pick up the projection on the input member as the abutment travels about the axis of the zero setting shaft.

A further feature of the invention has to do with the provision of gearing on the zero setting shaft and in conjunction with the wheel of lowest denomination whereby the control mechanism of the counter may be caused to drive and control corresponding parts of a skeletonized counter designed to give the same indications. The feature is useful, for example, in connection with counters used in gasoline filling stations to enable the operator of a vehicle to read from either side of the pump the quantity or price of gasoline put into his gasoline tank, that is to say, to read the quantity or price of the gasoline from the driver's seat whether the vehicle be parked on the left side of the pump or on the right side. For such a purpose the primary or control counter, which is the one illustrated herein, and the skeleton counter are desirably operated and controlled in unison and without unnecessary duplication of parts.

Other objects and advantages will hereinafter appear.

In the drawings forming part of this specification and illustrating a practical and advantageous embodiment of the invention.

Figure 1:
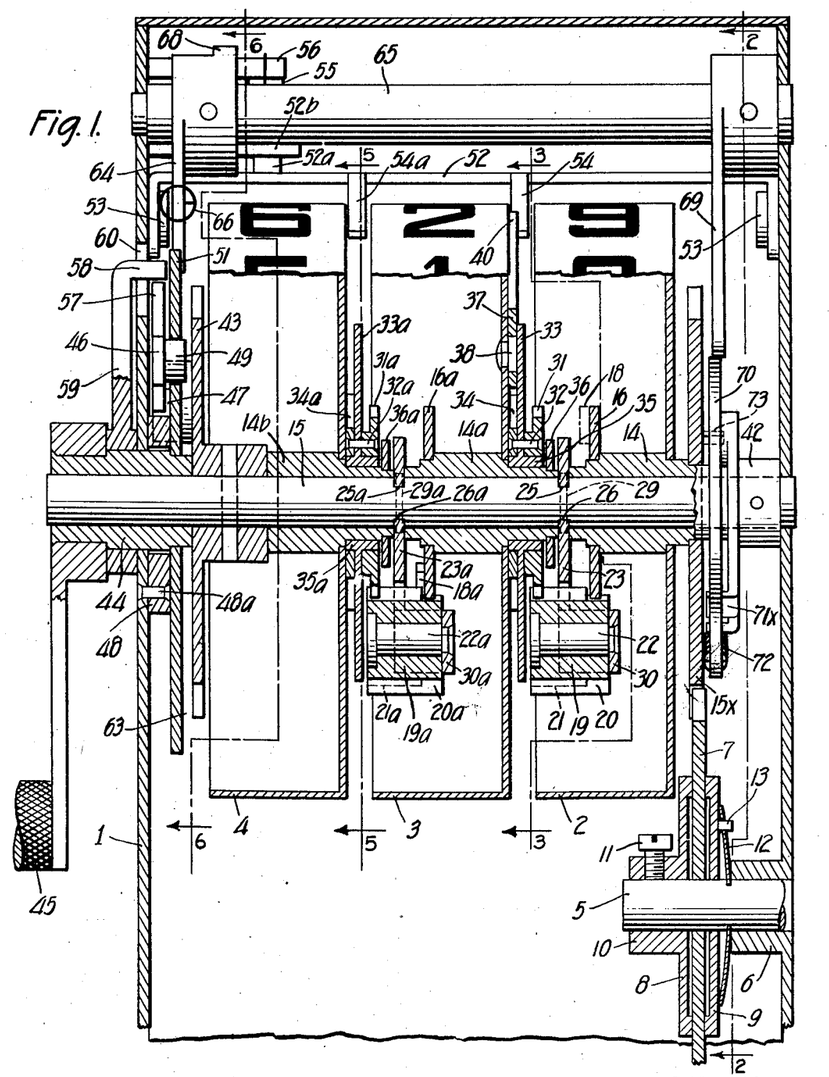
Fig. 1 is a vertical, front view in sectional elevation of a counter embodying the invention, the dial wheels being partly broken away and the section being taken on the line 1—1 of Fig. 2.
Figure 2:
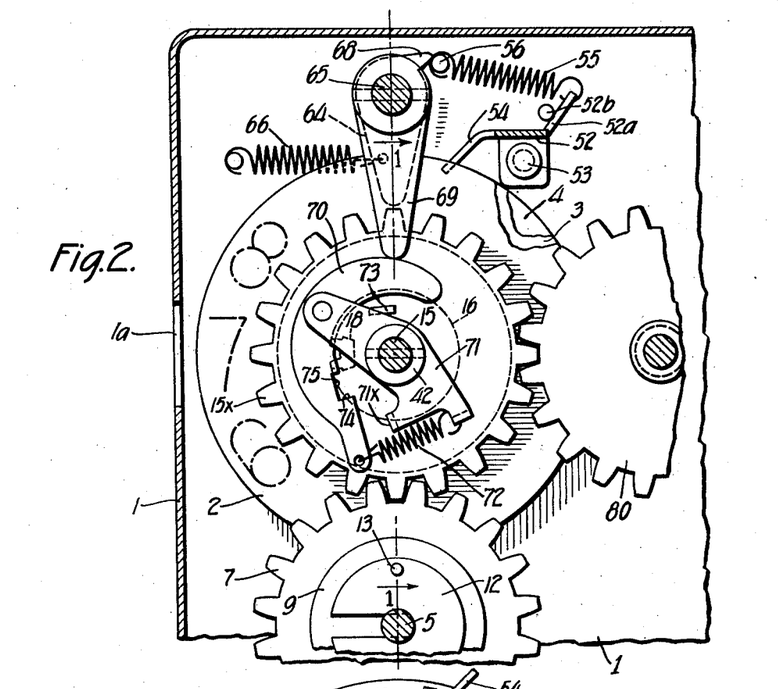
Fig. 2 is a vertical, sectional view taken on line 2—2 of Fig. 1, looking in the direction of the arrows.

The illustrative counter comprises a casing, 1, and decimal denomination wheels 2, 3, and 4 coaxially mounted in the counter, Figs. 1 and 2. As many denomination wheels as desired may be provided each having numerals 0 to 9 thereon which may be observed, one at a time, through a sight opening 1a in the frame 1. As illustrated, the wheel 2 is the wheel of lowest denomination or units wheel. The counter is driven from a primary operating shaft 5 which enters the casing through a bearing 6 located below the denomination wheels. The shaft 5 will generally be positively connected to operating mechanism which can operate in a forward direction but not in a reverse direction. Provision is, therefore, made for enabling the shaft 5 to drive the counter forward but to remain idle during zero setting operations of the shaft. To this end a counter driving gear 7 is mounted upon the shaft 5 with freedom for rotation relative to the shaft, and is frictionally clamped between a pair of plates or discs 8 and 9. The disc 8 has a hub portion 10 which is made fast to the shaft by means of a set screw 11. The disc 9 is pressed against the gear 7 by means of a bowed spring 12 which bears against the bearing 6 of the casing 1. A peripheral portion of the bowed spring 12 is desirably impaled upon a pin 13 carried by the disc 9. The clamping pressure exerted upon the gear 7 by the discs 8 and 9 may be adjusted by setting the hub 10 toward or from the bearing 6 and securing the hub in whatever position is selected by means of the set screw 11. Only a very light force is required to drive the counter mechanism so that a light clamping pressure will be sufficient to assure the drive of the counter forward without any slipping. When the counter is reset to zero the gear 7 is driven backward as an incident of the zero setting operation but since the shaft 5 is locked against backward movement, the gear 7 turns backward without operating the shaft 5.

The lowest denomination wheel 2 is mounted fast upon a hub 14, Fig. 1, and the hub 14 is revolubly mounted upon a zero setting shaft 15 which extends through the casing from end to end thereof. The hub 14 also has fast upon it an input gear 15x which is in constant mesh with the driving gear 7. The wheel 2 is, therefore, driven in direct proportion to the forward drive of the shaft 5. A carry over mechanism is provided for advancing the wheel 3, Figs. 1 and 3, one step at the conclusion of each complete revolution of the wheel 2. For carry over purposes a Geneva disc 16 is mounted fast upon the hub 14.

Figures 3, 4:
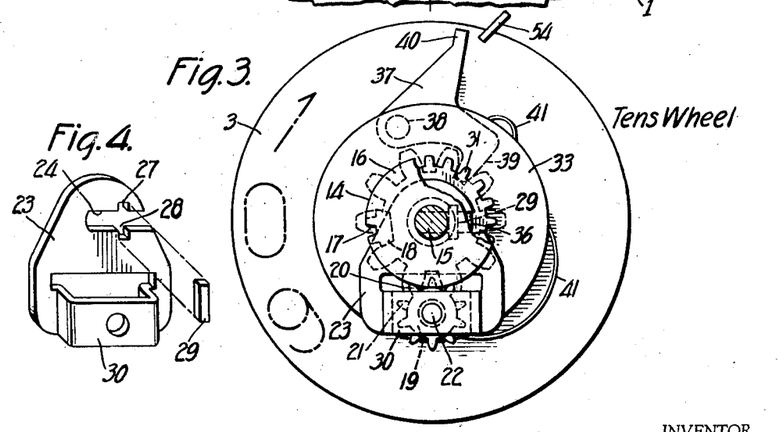
Fig. 3 is a vertical, sectional view taken on the line 3—3 of Fig. 1, looking in the direction of the arrows; some parts being omitted and some broken away for clearness of illustration.
Fig. 4 is a perspective view of a bracket for supporting one of the carry over transfer pinions.
Figure 5:
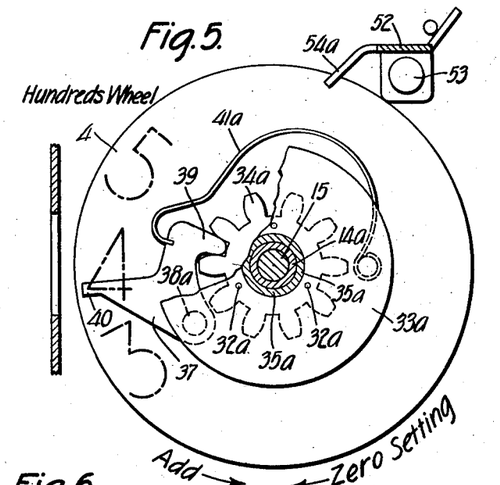
Fig. 5 is a vertical, sectional view taken on the line 5—5 of Fig. 1 looking in the direction of the arrows, some of the parts being omitted and some broken away for clearness of illustration.

This disc is of circular contour, see Fig. 3, and is formed with a single notch 17 in its periphery which notch is bounded by a side lug or gear segment 18 affixed to the disc and representing what would be the equivalent of two teeth of a twenty toothed gear.

A pinion 19 is arranged to be driven step by step by the disc 16, and its segmental lug 18. The pinion 19 has an even number of teeth of which alternate teeth 20 are long enough to extend across the plane of the disc 16 and to enter the notch 17 thereof. The other alternate teeth 21 are relatively short so that they escape engagement with the disc 16 itself at all times but are capable of meshing with the teeth of the lug 18. The pinion 19 is journalled upon a bearing pin 22 which is riveted to a carrying arm 23.

Details of the carrying arm are disclosed in Figs. 1, 3 and 4. The carrying arm 23 is formed with a slot 24. The zero setting shaft 15 has grooves 25 and 26, Fig. 1, formed in its opposite faces. The slot 24 receives that portion of the zero setting shaft which is reduced in thickness by the formation of the grooves 25 and 26. The arm 23 is formed with opposed notches 27 and 28 which let into the slot 24. After the arm 23 has been slipped onto the shaft 15, a locking pin 29 is placed with its ends disposed in the notches 27 and 28 and with its side engaging the surface of the shaft 15 between the grooves 25 and 26. The locking pin is disposed between the hub 14 of the lowest denomination wheel, and a corresponding hub 14a of the wheel of next high denomination when the parts are fully assembled and is thus held against accidental displacement. The arm 23 is disposed substantially in line with the mid-section of the pinion 19, but is formed with an offset web 30 to which the bearing pin 22 is secured by upsetting.

Figure 14:
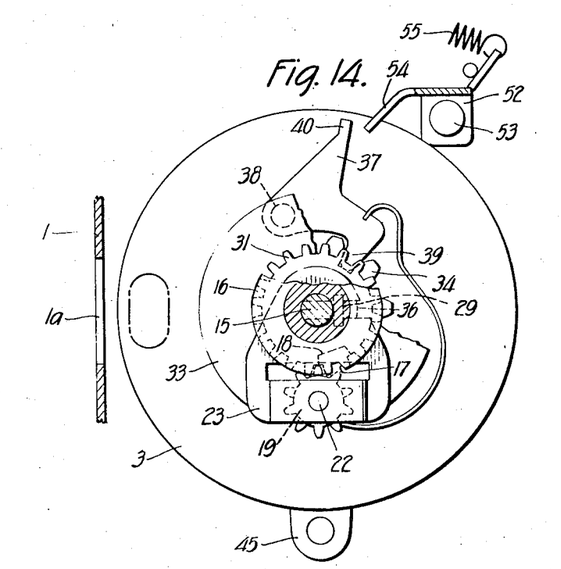
Fig. 14 is a view similar to Fig. 13 except that it shows the dial wheel and the zero setting handle completely restored to their normal positions and the carry over members between two of the wheels restored to normal.

The pinion 19 meshes with and drives a gear 31, Figs. 1 and 14, which is secured by means of a pin 32 to a disc 33 and to a gear 34. The disc 33 is provided with a sleeve or hub portion 35, and the gears 31 and 34 are impaled upon the hub portion 35 at opposite sides of the body of the disc 33. The hub 35 is journalled upon a reduced portion of the hub 14a, and is retained in place by means of a retaining disc 36 which is driven upon a further reduced portion of the hub 14a.

The number wheel 3, which is of next higher denomination than the number wheel 2, is fixed upon the hub 14a. A latch 37 is pivotally mounted upon a bearing pin 38, the pin 38 in turn being secured to the web or side portion of the wheel 3 by upsetting. The latch 37 is rockable upon the pin 38 and is held thereon by the disc 33. The latch includes a finger 39 and a tail 40, Fig. 14. A light spring 41 is connected to the latch 37 and to the side of the wheel 3 and normally maintains the finger 39 fully engaged between two adjacent teeth of the gear 34. While the member 34 has been called a gear and looks like a gear, it is really a multiple-notched detent wheel for coacting with the finger 39.

When the counter is being driven forward the wheel 2 and the disc 16 are turned through nearly a complete revolution, counter-clockwise in Fig. 2, before any effect is produced upon the carry over mechanism. The pinion 19 is then rotated two tooth spaces and again locked by the disc 16. At this time, the zero setting shaft 15 is held stationary, by means hereinafter described, so that the pinion 19 has no planetary movement. The pinion 19 in turn advances the gear 31 two tooth spaces, or a distance equivalent to one of the number divisions on the wheel 3. The gear 34 is carried forward in unison with the gear 31 and acts through the wheel 34 and latch 37 to drive the number wheel 3 forward one number space. This action is repeated for each full revolution of the wheel 2 until, at the tenth revolution, the wheel 3 acts through carry over mechanism to advance the wheel 4 one number space.

The carry over mechanism from the wheel 3 to the wheel 4 is the same as the carry over mechanism from the wheel 2 to the wheel 3 which has now been described. Since no detailed description of the second carry over mechanism is necessary, none will be given, but the corresponding parts have been designated by the same reference numerals with the subscript "a" added.

The hubs 14, 14a and 14b, together with the interposed arms 23 and 23a form a compact series which entirely fills the space on the shaft 15 between a hub 42 and the hub of a gear 43. The hub 42 and the hub of the gear 43 are pinned to the shaft 15.

The shaft 15, at its left hand end, is journalled in a sleeve 44, which sleeve constitutes a hub for a zero setting handle 45, and is journalled in the casing 1. The hub or sleeve 44 is arranged to drive the zero setting shaft 15 through interposed driving mechanism. The shaft itself, however, is, as previously mentioned, normally locked against rotation.

The shaft 15, is arranged to be unlocked by the first or preliminary movement of the zero setting handle 45, then to be driven by the handle 45 through approximately one revolution to set the counter back to zero, and then to be automatically relocked.

Figure 6:
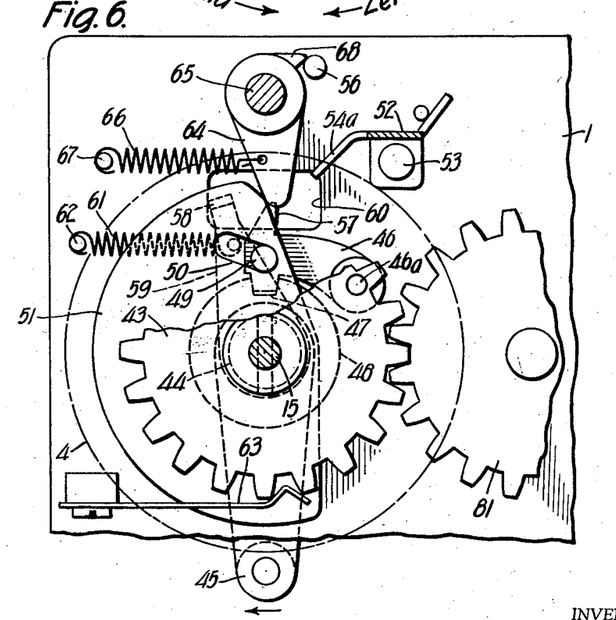
Fig. 6 is a vertical, sectional view taken on the line 6—6 of Fig. 1, some of the parts being omitted and some broken away for clearness of illustration.

The element 43, herein shown as a gear, is fast with the zero setting shaft 15, and has pivoted upon it a latch or locking member 46, see Figs. 1 and 6, which is normally engaged with a single notch 47 of a stationary disc 48 and is pivotally supported by a stud 46a upon the gear 43. The disc 48 is secured to the casing 1 by one or more rivets 48a and surrounds the sleeve 44. The latch member 46 carries a pin 49 which plays in an inclined slot 50 formed in an operating cam 51. The cam 51 is fast upon the sleeve 44 and is, therefore, invariably turned in unison with the zero setting handle 45.

Figure 7:
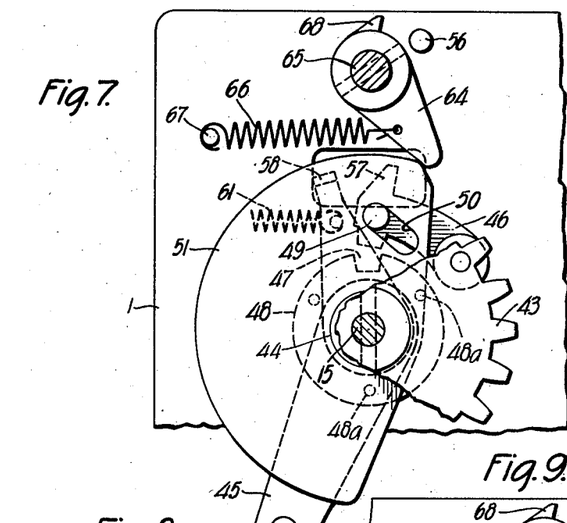
Fig. 7 is a view similar to Fig. 6, except that some of the parts have been omitted and the parts illustrated have been shown in the positions occupied by them in the initial part of the zero setting operation.

The first effect of movement of the zero setting handle is to turn the cam 51 from the position illustrated in Fig. 6 to that illustrated in Fig. 7. This causes the cam slot 50 to move the pin 49 away from the axis of the zero setting shaft 15 and hence, to swing the latch about its pivot 46a out of engagement of the notch 47 of the disc 48. When the pin 49 has become seated in the upper end of the slot 50, as illustrated in Fig. 7, continued rotation of the zero setting handle serves to drive the latch 46 in a clockwise direction, and the latch in turn drives the gear 43 and the zero setting shaft 15 in a clockwise direction as viewed in Fig. 7. As the zero setting shaft rotates clockwise, it carries with it the arms 23 and 23a upon which the pinions 19 and 19a are revolubly carried. The action may be described with reference to the pinion 19 and its associated parts.

The pinion, as it travels in a planetary path is held against rotation about its own axis by the wheel 16, save only for the rotation which is imparted to it when the notch 17 and the lug 18 are encountered. This rotation is equivalent to a single number space movement of the number wheel 3. So long as the pinion 19 is moved in a planetary path and is held against rotation about its own axis, it drives the gear 34 in unison with its own travel about the axis of the shaft 15. Since the pinion will not encounter the notch 17 and the lug 18 more than once in a revolution, a complete revolution of the pinion assures an available movement sufficient to drive the wheel 3 back toward zero through at least nine-tenths of a revolution. The wheel can never stand farther away from zero than nine-tenths of a revolution. The action of the carry over mechanism in moving the wheel 3 backward is duplicated with reference to the setting of the wheel 4 backward.

Figure 13:
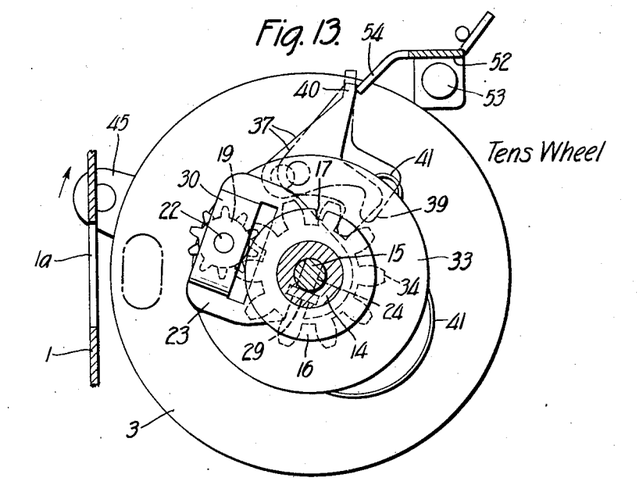
Fig. 13 shows a wheel of higher denomination, say the tens wheel restored substantially to zero position.

When the wheel 3 has reached the zero position, the revolution of the zero setting handle may not be complete. Provision is accordingly made of a rockable stop or detent member 52, Figs. 1 and 2, which is journalled on pins 53 secured to opposite sides of the frame 1 and which is provided with abutment arms 54 and 54a. The abutment arms 54 and 54a extend down into the paths of the tails 40 and 40a of the latches 37 and 37a. The member 52 is drawn counter-clockwise as viewed in Fig. 2 by means of a spring 55 which is secured to an arm 52a of the member 52 and to a pin 56 carried by the counter frame 1, said arm 52a engaging a stop pin 52b. When the tail 40 has been carried backward to the full line position illustrated in Fig. 13 it is intercepted by the abutment member 54 and prevented from moving farther backward. The gear 34 is permitted to continue its backward movement by reason of the fact that the latch 37 is rocked counter-clockwise by an engaged tooth or successively engaged teeth of the gear 34, to the dash line position illustrated in Fig. 13 against the force of the spring 41. The zero setting shaft is, therefore, caused to complete its operation while slipping with reference to each wheel that has reached the zero position. It should be noted that when the wheel 3 is traveling in a forward direction, its advance is not obstructed by the abutment 54 because in that direction of movement the tail of the latch 37 is unyielding and hence serves merely to cam the member 54 out of its way.

During the described zero setting operations, the latch 46 is maintained in an outwardly projecting position, that is to say, with the pin 49 seated in the outer end of the slot 50. The latch 46 has a tail portion 57 which, toward the end of the revolution, is carried against an obstructing finger 58 bent inward from an arm 59 which is rockably mounted on the hub 44. The arm 59 is supported outside the casing 1 and the finger 58 extends inward through a slot 60 formed in the casing. The opposite end of the slot 60 limits the movement of the finger 58 as in Fig. 9. The arm 59 is normally drawn to its lefthand limit of movement as viewed in Fig. 6, by means of a spring 61 which is connected to the arm and to a pin 62 fixed on the casing 1.

Figure 9:
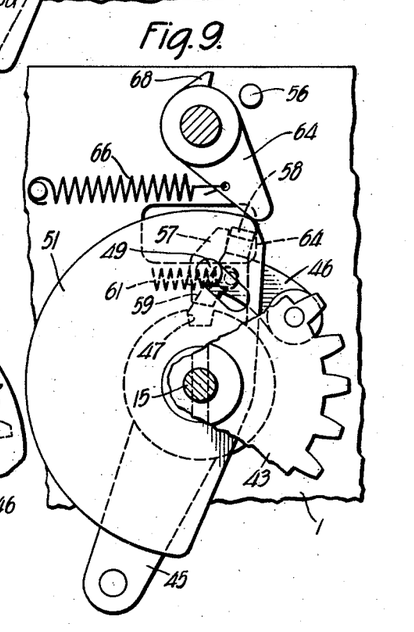
Fig. 9 is a view, similar to Figs. 6 to 8, which shows the zero setting handle temporarily arrested at the extremity of an operating stroke.

The tail 57 of the latch 46 picks up the finger 58 and carries it to the opposite end of the slot 60 where the finger 58 is positively arrested, as in Figure 9, and hence serves positively to arrest the latch 57 against further movement in a clockwise direction around the axis of the shaft 15. This precludes further clockwise movement of the zero setting shaft and all of the associated parts. It is still necessary, however, that the zero setting shaft be relocked.

To this end provision is made of a spring detent 63 which acts upon the gear 43 with sufficient force to prevent retrograde movement of the gear during relocking of the zero setting shaft. The cam is now automatically moved backward for a short distance to force the pin 49 down to the lower or inner end of the slot 50 and thereby to reengage the latch with the notch 47 of the locking disc 48. This return movement of the cam is produced by a rocking arm 64, Figs. 1, 6 and 9, which is fast upon a shaft 65. A spring 66 connected to the arm 64 and to a pin 67 fixed to the casing 1, tends to draw the arm 64 towards the left. Leftward movement of the arm 64, about the axis of the shaft 65, is limited by means of an abutment or tail 68 of the arm and the stationary pin 56 fixed on the casing 1.

As the cam reaches its final position of clockwise rotation, as illustrated in Fig. 9, the arm 64 is rocked to the position shown in Fig. 9 and the spring 66 is stressed. When the forward movement of the parts is arrested and the operating handle is released, the spring-urged arm 64 acts on the upper corner of the cam 51 to swing it backward to the position illustrated in Fig. 6. Since the gear 43 remains stationary during this movement, the latch 46 does not move with the cam, and hence is forced inward into locking engagement with the notch 47 of the disc 48 by the action of the cam slot 50 on the pin 49.

The inward movement of the latch 46 causes the tail 57 of the latch to clear the finger 58, and hence permits the spring 61 to pull the arm 59 back to the position illustrated in Fig. 6. The finger 58 is not, therefore, in position to obstruct the initial movement of the latch 46 as the next zero setting operation. Upon the completion of the zero setting operation the dial wheels 3 and 4 are rotated slightly from the position in Fig. 13 to that in Fig. 14.

The mechanism described is effective to set all denomination wheels except the wheel of lowest denomination back to zero through the associated carry over mechanism from the wheel of next lower denomination. Other means are provided for setting the wheel of lowest denomination back to zero since it has no carry over mechanism imparting movement to it.

Figure 8:
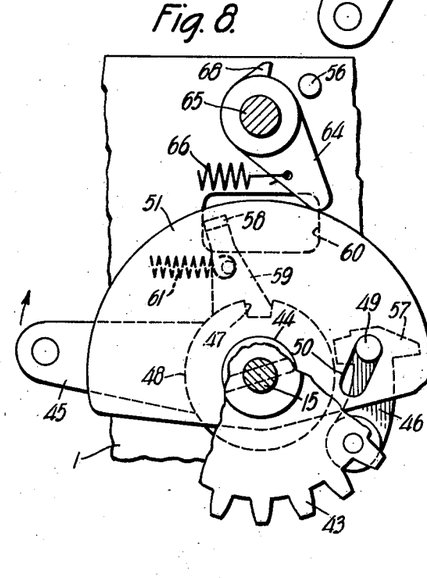
Fig. 8 is a view similar to Fig. 7 which shows the parts in a more advanced stage of the zero setting operation.

It will be observed that in connection with the resetting of the higher denomination wheels, the engagement of the cam 51 with the arm 64 which occurs near the end of the resetting operation was referred to. As a matter of fact the cam 51 also acts upon the arm 64 at the very beginning of a resetting operation and pushes it toward the right as in Fig. 7, holding it displaced throughout substantially one-half of a revolution of the cam (see Figs. 7, 8 and 9). Since the arm 64 is fixed on the shaft 65, the shaft 65 is rocked counter-clockwise by the rocking of the arm. The shaft 65 has an arm 69, Figs. 1 and 2, fixed to it in position to extend downward alongside the gear 15x. This arm normally engages one end of a lever 70 which is pivoted upon a second lever 71, the latter in turn being fixed upon the zero setting shaft through its hub 42. The tail portions of the levers 70 and 71 are connected to one another by a coil spring 72 which tends to draw them together. In the normal or idle position of the zero setting shaft 15, the engagement of the arm 69 with the lever 70 forces the tail of the lever 70 away from the tail of the lever 71 as in Fig. 2.

Figure 10:
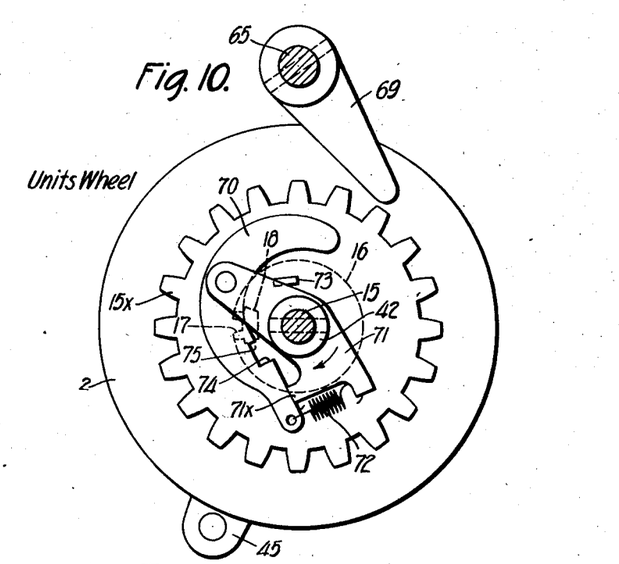
Fig. 10 shows the mechanism for resetting the units wheel to zero, the positions of the parts corresponding to the positions of the parts shown in Fig. 7.
Figure 11:
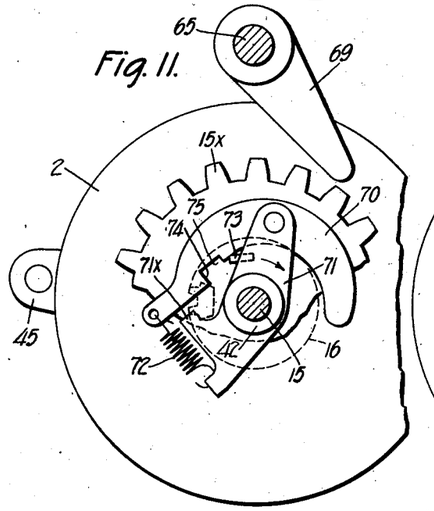
Fig. 11 is a view similar to Fig. 10 but showing parts in positions corresponding to the positions of the parts in Fig. 8.

The initial movement of the cam 51 which, it will be remembered, is independent of the shaft 15, is the movement which swings the arm 64 toward the right as in Fig. 7. Since both arms 64 and 69 are secured to the shaft 65 this movement, therefore, serves also to swing the arm 69 toward the right and clear of the path of the lever 70. Such movement of the arm 69, therefore, permits the tail of the lever 70 to swing over into engagement with an abutment 71x formed on the tail of the lever 71 as illustrated, for example, in Fig. 10. The two levers travel together, free of the influence of the arm 69, during the resetting operation and until the zero setting operation is complete.

Figure 12:
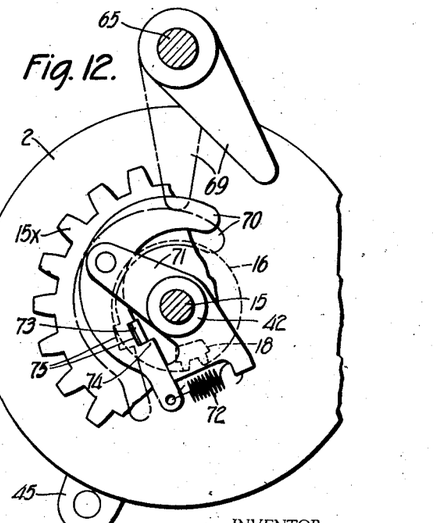
Fig. 12 is a view similar to views in Figs. 10 and 11 shows the parts corresponding to those of Fig. 9.

The gear 15x which drives the wheel of lowest denomination in unison with itself is provided with a projection or lug 73, which stands in position to be picked up by a shoulder 74 formed on the tail of the lever 70 and to become seated in a notch 75, one wall of which coincides with the shoulder 74. The lever 70 is carried through one complete revolution at the zero setting operation, and always comes to rest in the same position. The lug or projection 73 is, therefore, picked up in any position to which it may have been operated, and is carried around to the zero position as illustrated in Fig. 12. This position is reached when the zero setting shaft is arrested by engagement of the latch tail 57 with the finger 58 as illustrated in Fig. 9, which represents the locking position of the zero setting shaft. During the previously described, short retrograde movement of the cam 51 and the zero setting handle 45 induced by the spring 66 and the arm 64, the arm 69 is rocked from the full line position, illustrated in Fig. 12, to the dot and dash line position indicated in Fig. 12. In moving to the latter position the arm 69 rocks the lever 70 to separate its tail portion from the tail portion of the lever 71, and hence to carry the notch 75 and the shoulder 74 of the lever 70 to an ineffective position permitting free, forward movement of the lug 73 with the gear 15.

It will be noted that if the gear 15x is connected through intermediate gearing 80, Fig. 2, to a skeletonized counter having a zero setting shaft and having carry over mechanism of the kind which has been illustrated and described, the skeletonized counter may be driven in a forward direction for running in numbers on the counter in unison with the counter which has been described. It will also be noted that the gear 15x will serve to set the units wheel of such skeletonized counter back to zero when the described counter is set back to zero.

It should further be noted that by connecting the gear 43 through intermediate gearing 81, Fig. 6, to the zero shaft of such skeletonized counter, the higher denomination wheels of the skeletonized counter will be set back to zero in unison with the corresponding wheels of the counter which has been described. This combination of counters, wherein one controls the other both for driving and for zero setting, is regarded as novel and as comprehended within the scope of the present invention.

I have described what I believe to be the best embodiments of my invention. I do not wish, however, to be confined to the embodiments shown, but what I desire to cover by Letters Patent is set forth in the appended claims.

I claim:

1. In a counter, the combination with coaxially mounted denomination wheels, of Geneva carry over gearing interconnecting adjacent denomination wheels and comprising in each instance a driving and locking disc, a pinion engaging the disc and adapted to be rotated step by step by the disc, a driven full-toothed gear mounted coaxially with the disc and in constant mesh with the pinion, means forming a positive forward driving connection and a yieldable reverse driving connection between each of said full toothed gears and the denomination wheel operated by it, and means normally holding the pinions against bodily movement but operable at will to impart planetary movement to the pinions for zero setting purposes.

2. In a counter, the combination with coaxially mounted denomination wheels, of Geneva carry over gearing interconnecting adjacent denomination wheels and comprising in each instance a driving and locking disc, a pinion engaging the disc and adapted to be rotated step by step by the disc, a driven full toothed gear mounted coaxially with the disc and in constant mesh with the pinion, means forming a positive forward driving connection and a yieldable reverse driving connection between each of said full toothed gears and the denomination wheel operated by it, and means normally holding the pinions against bodily movement but operable at will to impart planetary movement to the pinions for zero setting purposes, comprising a zero setting shaft, pinion bearing brackets fast on the shaft, and cooperating members for locking the zero setting shaft.

3. A counter as set forth in claim 2, which further includes a zero setting handle, and means operated by the handle for first unlocking the zero setting shaft, and then driving the shaft.

4. A counter as set forth in claim 2, which further includes a zero setting handle, and means operated by the handle for first shifting one of the locking members to an unlocked condition and then driving the zero setting shaft through said locking member.

5. In a counter, the combination with denomination wheels, means for operating a wheel of lower denomination, and carry over means for operating a wheel of higher denomination including a Geneva train which connects the wheels at all times, of zero setting means comprising a zero setting shaft, and a zero setting handle for operating the shaft, said Geneva train including a member carried by the zero setting shaft and revoluble therewith, means normally locking the zero setting shaft stationary, and means operated by the zero setting handle to unlock the shaft.

6. In a counter, the combination with denomination wheels, means for operating a wheel of lower denomination, and carry over means for operating a wheel of higher denomination including a Geneva train which connects the wheels at all times, of zero setting means comprising a zero setting shaft, a latch carried by the shaft, stationary means cooperating with the latch for normally locking the zero setting shaft against rotation, a rotary zero setting handle and a cam fast with the handle, said cam being cooperative with the latch in the first part of the handle movement to shift the latch to unlocking position, and in the subsequent movement of the handle to drive the zero setting shaft through the latch.

7. A counter as set forth in claim 6 which further includes a stop located to obstruct and arrest the latch substantially at the end of a single revolution of the latch when the latch is in unlocking position, but to clear the latch when the latch is in locking position, said stop being mounted with capacity to be driven for a limited distance about the axis of the zero setting shaft by the latch, and serving then positively to arrest the latch, means acting on the cam to restore the latch to locking position when the latch is arrested, and means for thereafter shifting the stop past the latch.

8. In a counter, the combination with denomination wheels, means for operating a wheel of lower denomination, and carry over means for operating a wheel of higher denomination, of zero setting means comprising a zero setting shaft, a latch carried by the shaft, stationary means cooperating with the latch for normally locking the zero setting shaft against rotation, a rotary zero setting handle and a cam fast with the handle, said cam being cooperative with the latch in the first part of the handle movement to shift the latch to unlocking position, and in the subsequent movement of the handle to drive the zero setting shaft through the latch, and means cooperative with the latch and the cam to arrest the zero setting handle and shaft and restore the latch to locking position.

9. In a counter, the combination with denomination wheels, means for operating a wheel of lower denomination, and carry over means for operating a wheel of higher denomination, of zero setting means comprising a zero setting shaft, a latch carried by the shaft, stationary means cooperating with the latch for normally locking the zero setting shaft against rotation, a rotary zero setting handle and a cam fast with the handle, said cam being cooperative with the latch in the first part of the handle movement to shift the latch to unlocking position, and in the subsequent movement of the handle to drive the zero setting shaft through the latch, and means cooperative with the latch and the cam to arrest the zero setting handle and shaft and restore the latch to locking position, and a spring detent for yieldingly fixing the position of the zero setting shaft prior to relocking thereof.

10. In a counter, in combination, denomination wheels, means for operating a wheel of lower denomination, a projecting member carried thereby, carry over means for operating a wheel of higher denomination, zero setting means comprising a zero setting shaft, a zero setting handle, an arm fast on the zero setting shaft, a lever pivoted on said arm, said lever having an abutment portion adapted to engage and drive the projecting member in zero setting operations, a spring acting on the lever and urging the abutment portion into position to pick up the projecting member, said lever also having a cam portion, a dog for acting on the cam portion to maintain said lever normally in an inoperative condition, and means operated by the zero setting handle to move the dog to an ineffective position.

11. In a counter, the combination with denomination wheels, of means for driving the wheel of lowest denomination, carry over means for driving the wheels of higher denominations, said carry over means comprising in each instance a gear driven intermittently by the lower of two adjacent denomination wheels, and a spring pressed latch revoluble in unison with the higher of said two denomination wheels, to form a positive forward drive and a yielding reverse drive for said higher denomination wheel, a zero setting shaft for driving all of said carry-over gears backward, said spring pressed latches having outwardly projecting tail portions and spring pressed abutments constructed and arranged to be cammed aside by forward movement of the latch tails but positively to intercept and arrest reverse movement of the latch tails.

PETER J. McLAREN.